(12) United States Patent
Schaefer

(10) Patent No.: US 10,915,242 B1
(45) Date of Patent: Feb. 9, 2021

(54) INTERFACE TO COMPUTER AND OTHER DISPLAY INFORMATION

(71) Applicant: Philip R. Schaefer, Weaverville, NC (US)

(72) Inventor: Philip R. Schaefer, Weaverville, NC (US)

( * ) Notice: Subject to any disclaimer, the term of this patent is extended or adjusted under 35 U.S.C. 154(b) by 0 days.

(21) Appl. No.: 16/166,512

(22) Filed: Oct. 22, 2018

Related U.S. Application Data

(63) Continuation of application No. 15/632,932, filed on Jun. 26, 2017, now abandoned, which is a continuation of application No. 14/456,947, filed on Aug. 11, 2014, now abandoned, which is a continuation of application No. 12/001,826, filed on Dec. 12, 2007, now abandoned.

(60) Provisional application No. 60/875,712, filed on Dec. 19, 2006.

(51) Int. Cl.
*G06F 3/048* (2013.01)
*G06F 3/0488* (2013.01)
*G06F 3/041* (2006.01)
*G06F 3/01* (2006.01)

(52) U.S. Cl.
CPC ............ *G06F 3/0488* (2013.01); *G06F 3/041* (2013.01)

(58) Field of Classification Search
CPC ........ G06F 3/0488; G06F 3/041; G06F 3/048; G06F 3/0481
See application file for complete search history.

(56) References Cited

U.S. PATENT DOCUMENTS

| | | | | |
|---|---|---|---|---|
| 5,319,747 A | * | 6/1994 | Gerrissen | G06F 3/017 715/839 |
| 5,872,559 A | * | 2/1999 | Shieh | G06F 3/0488 345/157 |
| 7,148,875 B2 | * | 12/2006 | Rosenberg | G06F 3/04847 345/156 |
| 2008/0189630 A1 | * | 8/2008 | Kondo | G06F 3/0346 715/762 |

* cited by examiner

*Primary Examiner* — Nicholas Augustine
(74) *Attorney, Agent, or Firm* — Toering Patents PLLC

(57) ABSTRACT

An interface system enables a user to navigate a graphical user interface by touching output regions on a touch surface or by interacting with other types of displays that present regions whose locations can be sensed by the user. The arrangement of the output regions on the output device is defined statically or dynamically to correspond to display items that are displayed by a target device, such as a computer or game. The output regions may be automatically and dynamically extracted from the software that creates the visual display on the target device. Features are included to consolidate complex displays into manageable groups.

1 Claim, 13 Drawing Sheets

INTERFACE TO COMPUTER AND OTHER DISPLAY INFORMATION

CROSS-REFERENCE TO RELATED APPLICATIONS

This patent application is a continuation of U.S. patent application Ser. No. 15/632,932, which was filed on Jun. 26, 2017; which in turn is a continuation of U.S. application Ser. No. 14/456,947, which was filed on Aug. 11, 2014; which in turn is a continuation application of U.S. application Ser. No. 12/001,826, which was filed on Dec. 12, 2007; which in turn claims priority to U.S. Provisional Application No. 60/875,712, which was filed Dec. 19, 2006. The contents of each of the foregoing applications are incorporated herein by reference in their entirety.

GOVERNMENT LICENSE RIGHTS

This Invention was made with United States government support under one or more SBIR grants from the National Science Foundation. The United States government has certain rights in this invention.

FIELD OF INVENTION

This invention relates generally to tactile and visual displays of information and, more particularly, to a device that presents an input/output interface to information by use of vibration or by other alternatives to standard electronic device displays.

BACKGROUND OF THE INVENTION

The Microsoft® Windows® and Macintosh® operating systems have revolutionized computer usability for the sighted population with their graphical user interfaces. The graphical, window-based interface provides an intuitive, visual replacement for the complex internal representation of the underlying computer data. The vast majority of people find the visually-based organization much easier to use, and many years of development effort have been devoted to creating an easy-to-use environment.

A primary type of the graphical user interface utilizes active portion of a computer screen called windows. (These functional windows are not to be confused with the brand of software distributed by Microsoft Corporation that uses window, which is called Microsoft® Windmills®, Throughout this specification, functional portions of the computer screen will be referred to as windows (lower case "w") and the brand of software distributed by Microsoft Corporation will be referred to as Microsoft Windows (brand name with uppercase "W"). Many such windows interfaces, other than Microsoft Windows, have been defined for computers, handheld devices, game controllers, telephones and other electronic devices with display screens.

For the majority of the visually impaired users, however, the windows interface has made computer use mom difficult. Experience has shown that most visually impaired users take much longer to learn to use windows software applications than they previously did for command fine software applications, such as DOS®. As described below, the current input/output technologies available to the visually impaired place them at a disadvantage with regard to computer usability. Furthermore, there are a growing number of situations where computers are used but associated computer monitors are not, such as the case in which space limitations preclude a computer screen on the monitor that is large enough to be useful. Therefore, it would be desirable to have a device that enables the user to navigate a graphical user interface by touch, with or without a display screen such as a computer monitor.

All windows software is of a visual, spatial nature, which puts the visually impaired at a significant disadvantage. Many aspects of the computer screen are experienced in parallel by the sighted person who uses a mouse to graphically control the application with pointing and clicking motions. The sighted user often returns to previously selected objects on the screen, which can rapidly be accessed through sight. Each new generation of software is more graphically oriented than the previous, and text is often used more as a hint to the function of the underlying command than the complete identifier.

Therefore, to make windows software usable and understandable in circumstances where a computer screen cannot be seen or a monitor is not used, it is important for the input/output interface to be spatially-oriented: to capture the parallel aspects of the software interface, to allow the user to rapidly examine the available graphical options, and to enable the user to access previous locations through spatial, rather than memory techniques. My approach to control the application that allows only a small part of the screen to be experienced at any point in time mitts against this goal. As discussed below, nearly all-current approaches do just tha.

Screen readers convert text in the window into speech. Various commands can be issued from the keyboard (or using a speech-understanding software), which cause menus to be read out, items to be selected, etc. Unfortunately, screen readers do not present a spatial or parallel experience of the screen. They tend to provide a confusing, lengthy listing of many irrelevant details, leaving the uninitiated user in a state of total, confusion. Screen magnifiers are also used to magnify a small part of the screen to a size that is readable by the user. For many individuals, those who must magnify individual words or icons to the size of the screen, the spatial, parallel nature of windows software is also lost. The user must serially magnify many objects on the screen to reach the desired point. Unless an accurate mental model of the whole window or screen is established, it is vary easy for these users to became hopelessly lost.

Another approach to windows interfacing is to present audible signals to the user to indicate graphical information. For example, U.S. Pat. Nos. 5,223,828 and 5,374,924 disclose technology to provide graphical information about when the mouse pointer is moved over window boundaries, when it is in the title area, etc. This helps to provide a measure of information to the user that is not available in speech-only approaches. The drawbacks to the audible signals are similar to the screen magnifier approach, in that the information is from only a small part of the screen. For the user to obtain a more global experience of the screen, the mouse must be scanned over the entire area. Going back to a previously visited spot is delimit because no global, parallel experience of the screen is available.

Several approaches have been developed to provide force feedback or other tactile information to the user, such as those disclosed in U.S. Pat. Nos. 5,714,978; 5,736,978; 5,903,456; and 6,078,308. For example, the force required to move the mouse over boundaries can become greater as the distance to the boundary becomes less. Bumps and other tactile information can be presented to the user through, this technology as the pointer is moved over various objects on the screen. Several researchers have developed technologies to present a tactile version of what is on the screen. U.S. Pat.

No. 5,912,660 discloses using an any of pins to represent a tactile version of an, image or part of an image, such as an array of 32 rounded pins for each of three fingers on the mouse. This approach is relatively complex and expensive, due to the mechanical nature of the output mechanism. Like the audible feedback approaches, these devices have the disadvantages of not providing a parallel, spatial sensation to the user.

A touch screen allows tactile input, but indicates the functional areas only visually and does not provide tactile output. Touch screens do not enable high-speed, multi-lingered operation from the user. Touch Graphics (www-.touchgraphics.com) has developed a series of products in which thin, tactile surface, called overlays, for particular games and learning applications are placed over a touch screen. This approach provides a spatial, parallel tactile input surface. Unfortunately, however, typical windows applications rapidly change the information on the screen, such as by providing pop-up dialog boxes, drop-down menus, and other short-term graphical structures. It would be impractical to provide overlays for all the potentially visible graphical structures in rapid succession. Additionally, a touch screen is a very costly item competed to other potential input technologies. U.S. Pat. No. 7,148,815 to Rosenberg, et at, adds a vibration device to a touch pad, but provides no means to reduce the complexity of the displayed data so as to be easily understood by touch.

Another approach to providing tattle interface to computer data is by using a surface with a fixed array of holes or other features, and mapping these fixed features to the computer data items, as disclosed in U.S. patent application Ser. No. 10/280,581. However, such an approach limited to the static arrangement of features on the surface, and hence cannot display the shapes and relative sizes of the real items that are actually on the computer display.

Another technology applicable to a touchable screen is electro-rheological fluids, as disclosed in U.S. Pat. No. 5,222,895. When subjected to an electric field, the viscosity of the fluid changes quickly. A dynamically changing tactile screen can therefore be mated, by producing localized fields at the points where a raised sensation is desired. However, the technology for doing this at high resolution is currently very cumbersome and expensive.

To summarize, many technologies are available for providing a non-visual interface to windows software applications. However, they all have one or more serious shortcomings: the user cannot experience the entire window in parallel; or the interfaces are not adaptive to the typical dynamically changing screens of windows software applications; the tactile sensations are too complicated to be easily understood, or they, are very expensive.

In addition to computer display needs as described above, visually impaired users have needs to interact with other types of visual displays, such as in computer games, control panels for ordering food or at information and ticket kiosks, etc., and the problems are analogous. Also, in addition to the use of tactile, spatial information for the blind, there may be newts for such information to be displayed for other non visually impaired users, such as for people while driving a car or controlling other machinery, uses in darkness, etc.

Therefore, it is an object of this invention to provide a tactile input/output interface that enables a user to examine the contents of a graphically oriented display rapidly, and in parallel, by touch. It is another object of this invention to provide a tactile input/output interface that is adaptive to the typical dynamically changing screens of windows software applications and other video type displays. It is a further object of this invention to provide a tactile input/output interface usable with all are applications having graphical user interfaces, as well as for other video uses. It is another object to provide a tactile input/output interface having low-cost rugged technology.

SUMMARY OF THE INVENTION

The subject invention relates generally to tactile and visual displays of information and, more particularly, to a device that presents an input/output interface to information by use of vibration or by other alternatives to standard electronic device displays. One preferred embodiment of the subject invention is a tactile interface system for enabling a user to navigate a graphical user interface, such as a windows interface, by touching a touch surface of a tactile interface device. The tactile interface system of the subject invention determines the point at which the touch is occurring on the touch surface of the tactile interface device of the system, then, provides haptic feedback to the user through the touch surface in the form of vibrations. The arrangement of the output regions on the touch surface of the tactile interface device is static or dynamic, and is determined by the software in the subject invention to correspond to the functions or graphical display items on the graphical user interface. The functions may be automatically and dynamically extracted from the software that creates the window display.

A preferred interface system of the subject invention for enabling a user to interface with an electronic device performs extraction, consolidation and display functions. The extraction function the system obtains a plurality of display items from an electronic device that are each associated with an identity, location, and/or a text label and outputs an extraction display item configuration that has one or more display item groups. The consolidation function accepts extraction display item configurations outputted from the extraction function and outputs consolidated display item configurations relating to those inputted extraction display item configurations. The consolidation function of the system includes splitting and/or merging means for creating and outputting, for each inputted extraction display item configuration, a consolidated display item configuration having, for the one or more display item groups of the inputted extraction display item configuration, one or more consolidated display item groups created by a process of display item group splitting and/or, where there are more than one display item groups of the inputted extraction display item configuration, a process of display item group merging in ng the one or more display item groups of the inputted extraction display item configuration. The display function of the system accepts consolidated display item configurations outputted by the consolidation function and creates interface output regions. The display function includes means for displaying for each inputted consolidated display item configuration one or more of the interface output regions in an output configuration that corresponds in location to the one or more consolidated display item groups of the inputted consolidated display item configuration. Preferably, the consolidation function of the system also includes, for substandard consolidated display item configurations created by the consolidation means and not meeting a desired standard, iterating means for further processing the substandard consolidated display item configurations created by the consolidation function in a manner substantially equivalent to the processing of the inputted extraction display item configurations to obtain and output to the display function of the system consolidated display item configurations meeting the standard.

Where the consolidation function for creating and outputting a consolidated display item configuration is splitting means, the splitting means, where required for the creation of the consolidated display item configuration for each inputted extraction display item configuration, splits at least one of the one or more display item groups of each inputted extraction display item configuration. Where the consolidation function for creating and outputting a consolidated display item configuration is merging means, the merging means, where required for the creation of the consolidated display item configuration for each inputted extraction display item configuration having a plurality of display item groups, merges at least some of the display item groups of each inputted extraction display item configuration. Where the consolidation function for creating and outputting a consolidated display item configuration has splitting means and merging means, the splitting means, where required for the creation of the consolidated display item configuration for each inputted extraction display item configuration, splits one or more display item groups of each inputted, extraction display item configuration and the merging means, where required for the creation of the consolidated display item configuration for each inputted extraction display item configuration and there are a plurality display item groups in the inputted extraction display item configuration: (a) merges at least one of the display item groups of the inputted extraction display item configuration with another of the display item groups of the inputted extraction display item configuration, (b) merges at least one of the display item groups of the inputted extraction display item configuration with a display item group created by the splitting of one of the display item groups of the inputted extraction display item configuration, or (c) merges at least one of the display item groups of the inputted extraction display item configuration with another of the display item groups of the inputted extraction display item configuration to create a merged display item group and merges yet another of the display item groups of the inputted extraction display item configuration or the merged display item group with a display item group created by the splitting of one of the display item groups of the inputted extraction display item configuration.

BRIEF DESCRIPTION OF TH E DRAWINGS

Figure 5:
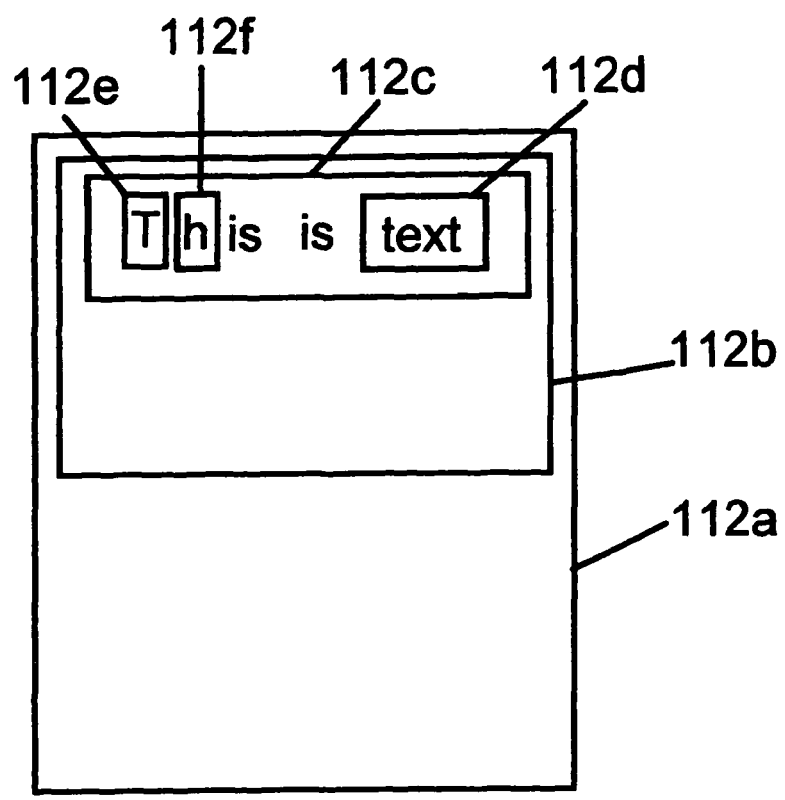

FIG. 5 schematically shows an example of a hierarchically organized text display that may be used in connection with the tactile interface system of the subject invention.

Figure 6:
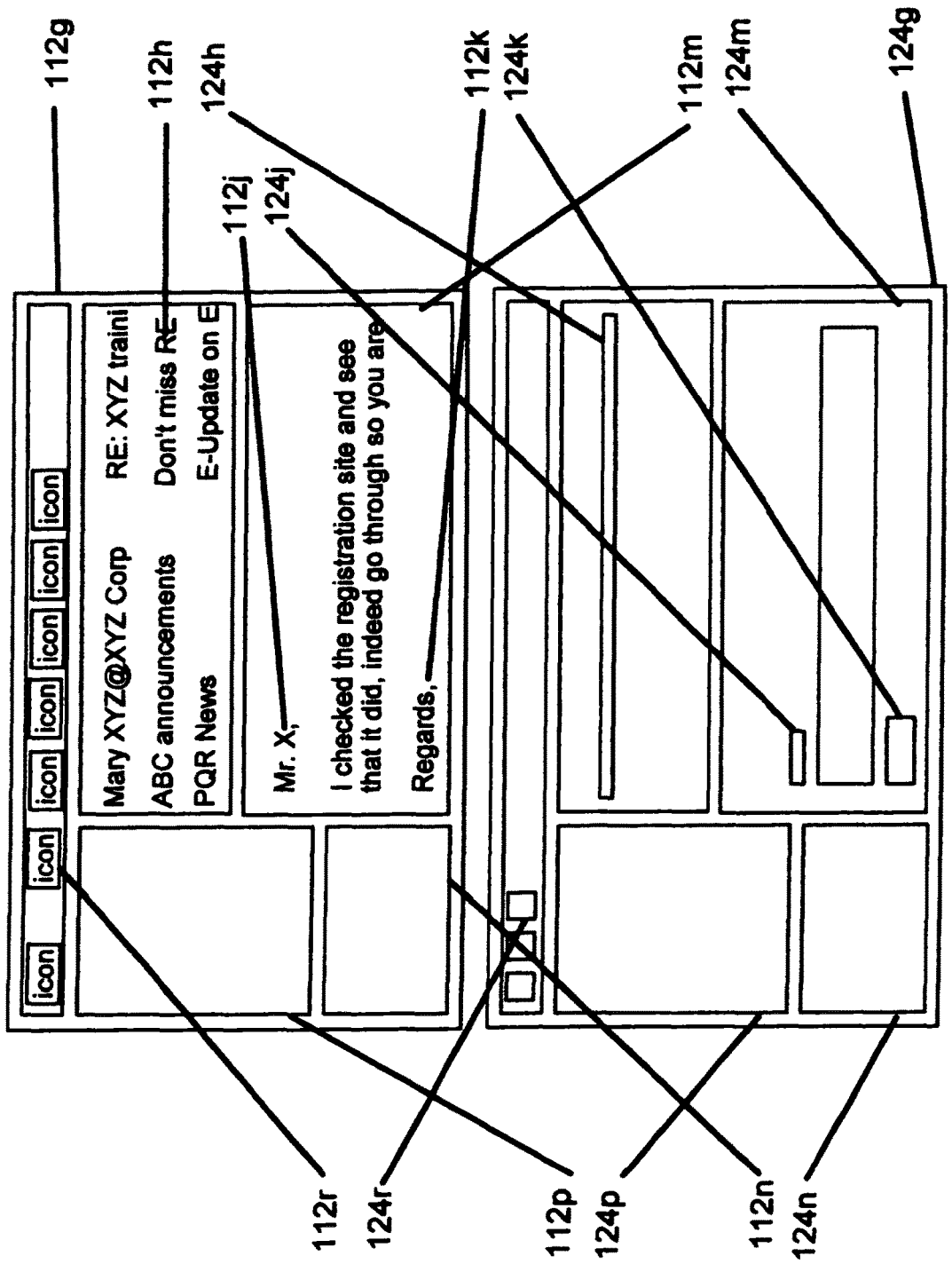

FIG. 6 schematically shows an example conversion of a window on a computer display to a set of output regions on a touch surface of a tactile interface device of the tactile interface system of the subject invention.

Figure 7A:
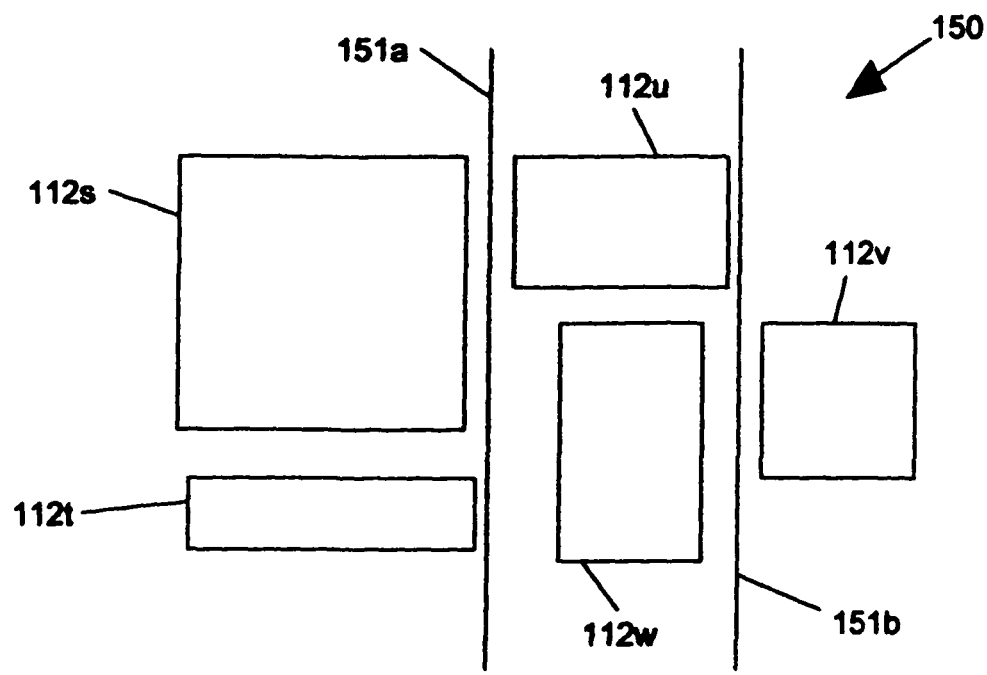
Figure 7B:
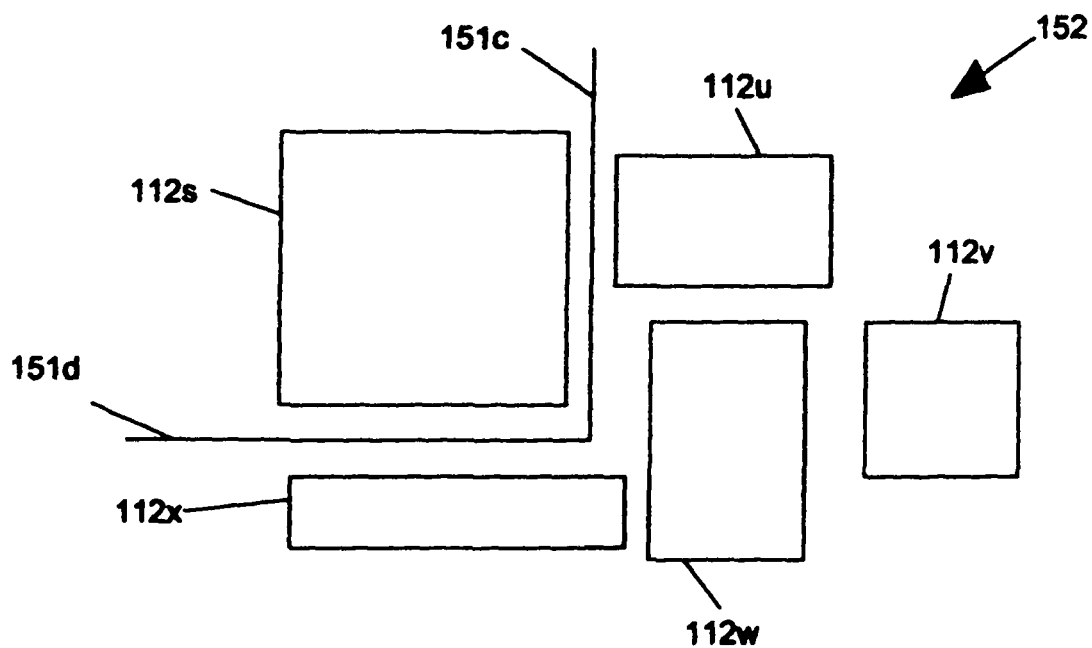

FIG. 7*a* and FIG. 7*b* demonstrate a process of finding gaps between a set of display items on a displayed window.

Figure 8A:
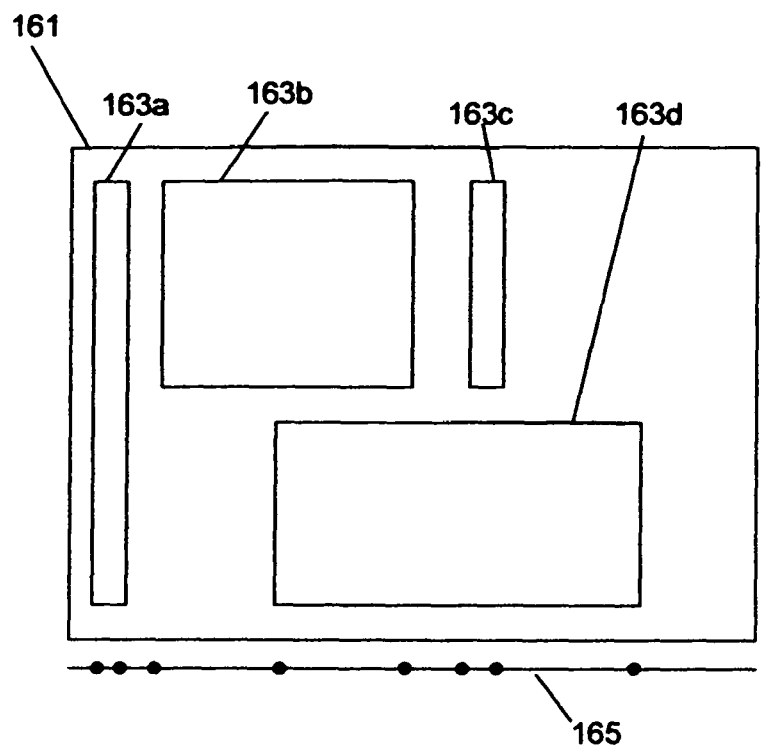
Figure 8B:
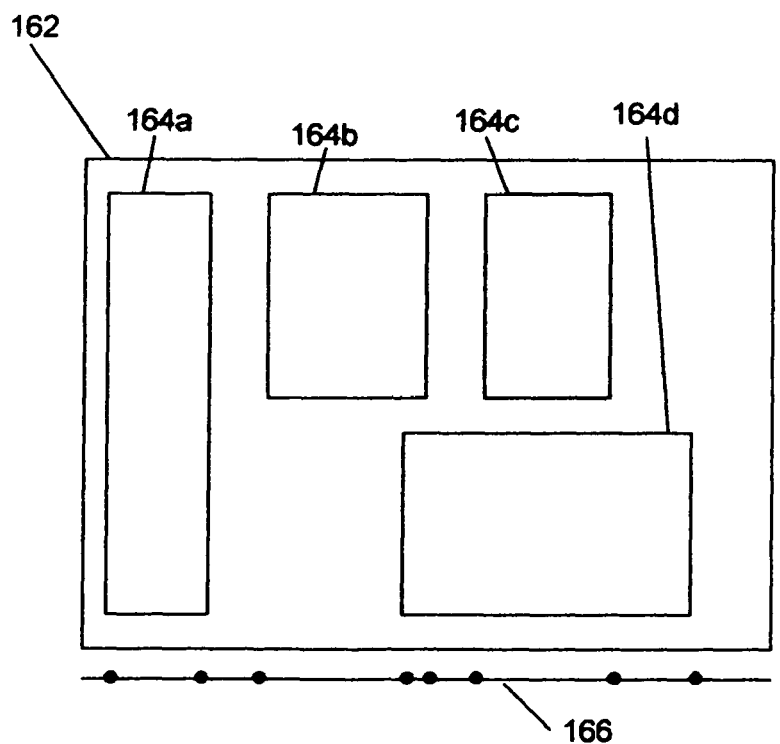

FIG. 8*a* and FIG. 8*b* depict a display that undergoes a process of resizing of the displayed items.

Figure 9:
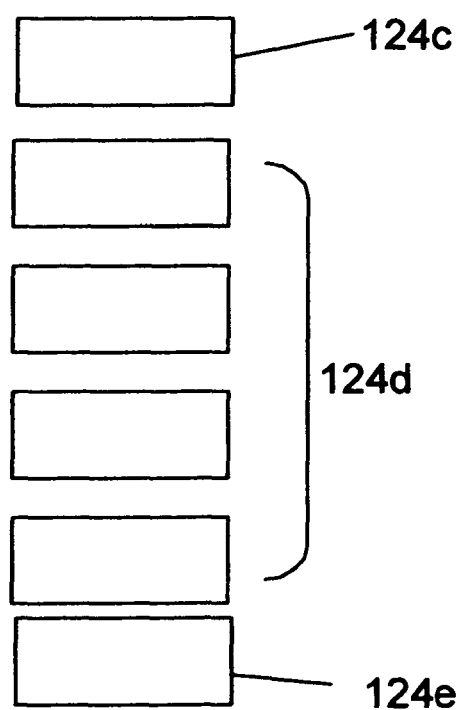

FIG. 9 schematically shows an example of scrolling among a group of output regions with the tactile interface device of the tactile interface system of the subject invention.

Figure 10:
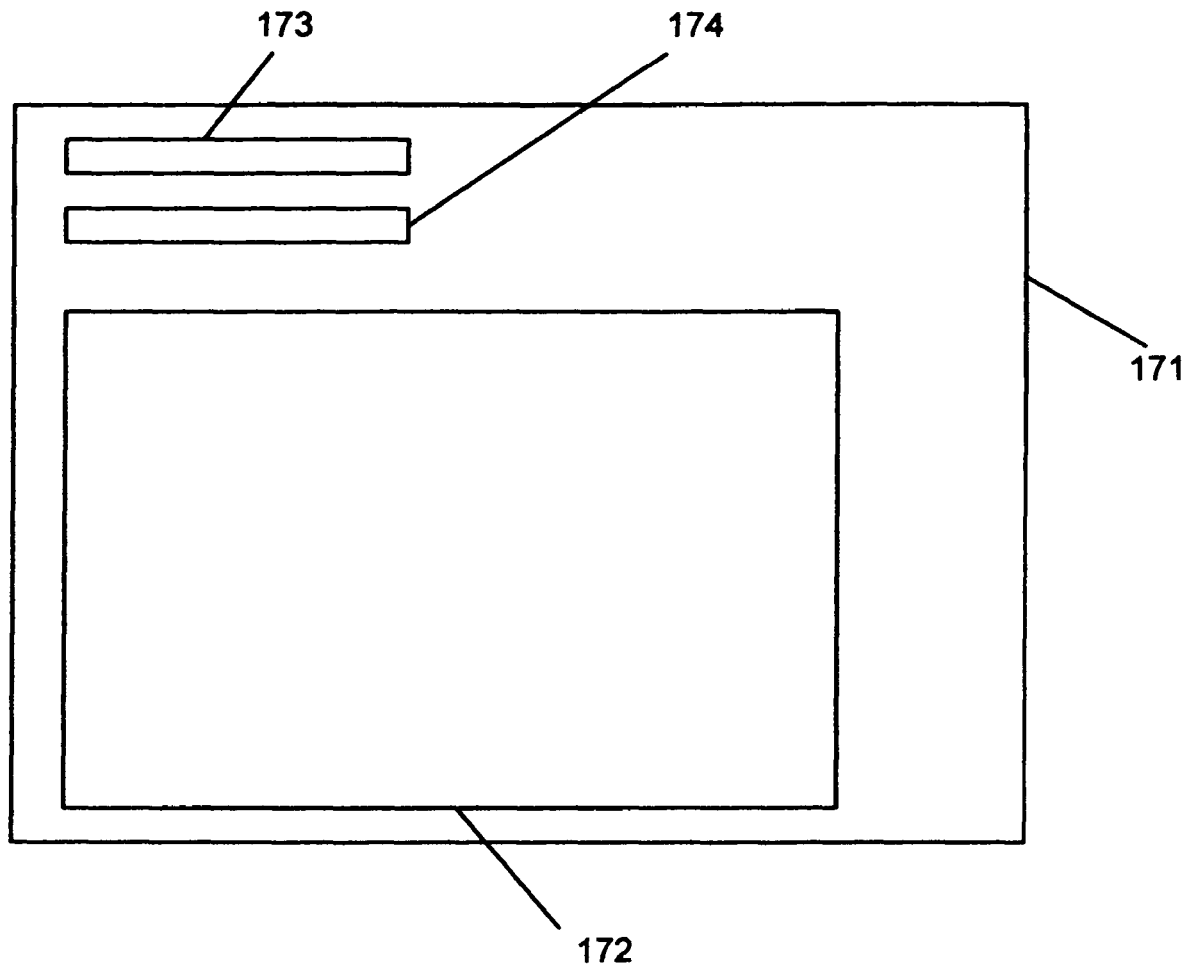

FIG. 10 depicts a display with a main section and additional display sections for menu and tool bar information.

Figure 11A:
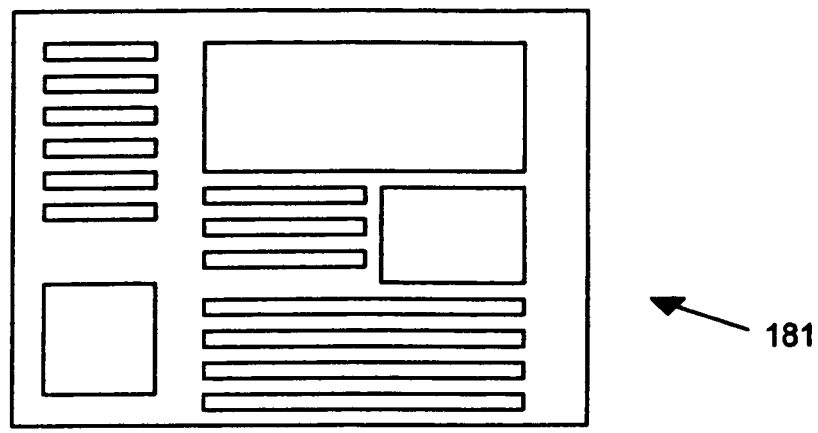
Figure 11B:
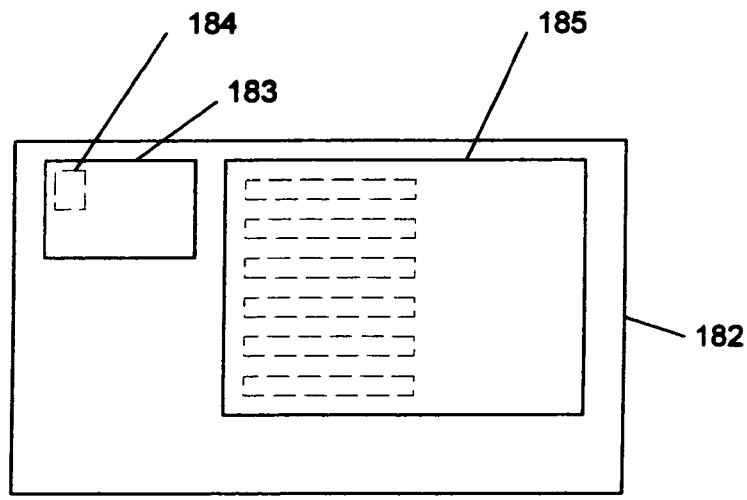

FIG. 11*a* and FIG. 11*b* depict a tactile display with a main display section and a smaller display section showing the extent of a group of display items.

Figure 12:
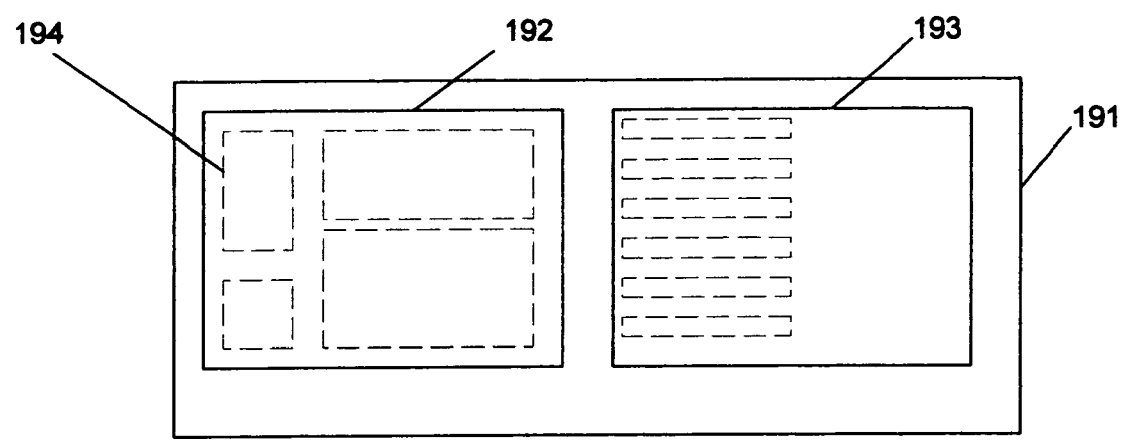
Figure 13:
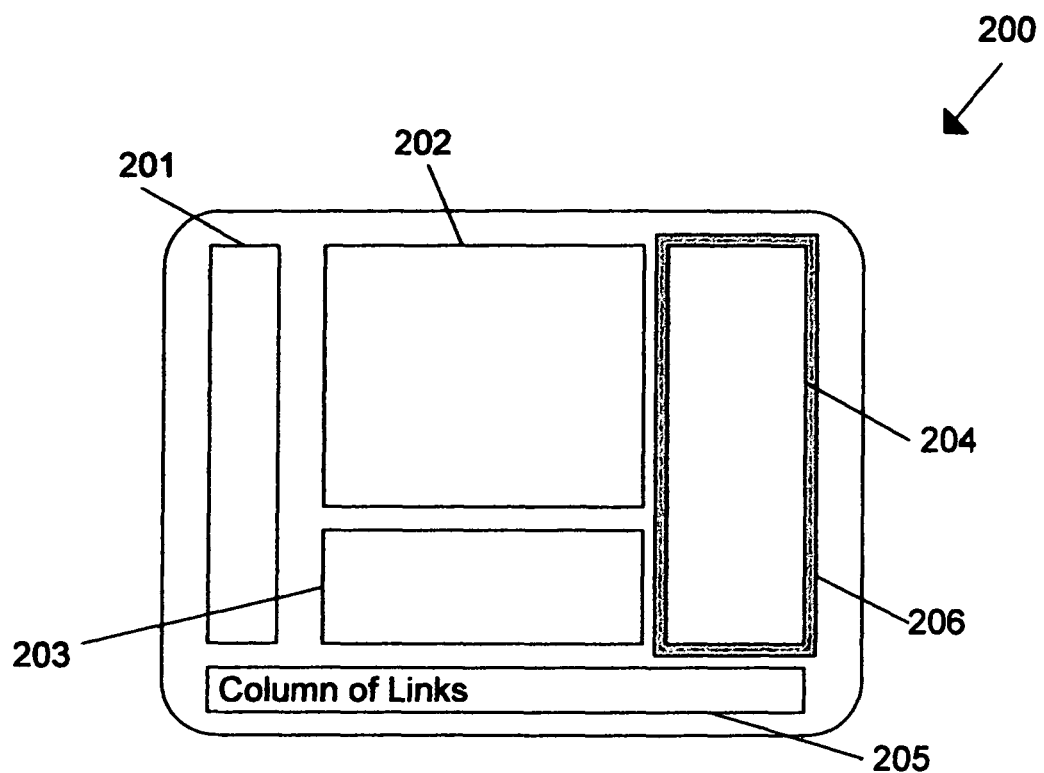

FIG. 12 depicts a tactile surface with multiple display sections to display both display items and display item groups, FIG. 13 depicts a display for a person who is not completely blind.

DESCRIPTION OF THE PREFERRED EMBODIMENTS

For graphical user interfaces that are windows software applications, window layouts can be quite complex, and a typical main window may well contain over one hundred objects or display items with which the user can interact. Many of these display items are primarily for aesthetic visual purposes. However, windows-based applications are typically built upon application programming interfaces (API) which supply basic functional units of the operating system, such as but not limited to the title bar, menus, toggle or off buttons, scroll bars, list boxes, text boxes, edit boxes, check boxes, etc. These basic functional units give the user venous options to receive output information from the operating system or give input information to the operating system and are referred to herein as display items. The display item visually representing each functional unit or option may be an icon. Examples of such APIs are known in the art. These APIs may be platform independent or the APIs may be platform-dependent such as the Microsoft Windows Application Programming Interlace or those APIs corresponding to UNIX, Linux, Palm, Macintosh, or other operating systems. When creating application software, the programmer places desired basic functional units from the API onto the application window as display items, and connects the application code of the operating system to these display item.

Similarly, the graphical items on the display screens of information kiosks, games, telephones or other hand held electronic devices, or other types of electronic devices with graphical user interfaces are determined by the designer and represented as display items on the display screens that are connected to the application codes of the operating systems for the electronic devices.

The tactile interface system of the subject invention creates a tactile representation of a graphical user interface, e.g. a visual window. Preferably the tactile representation is similar to the visual appearance of the window, but it may also include display items that are potentially, but not currently, visible on the window. Moreover, not every display item on a visual window is necessarily represented by the tactile interface system of the subject invention. In the tactile interface system of the subject invention, the tactile representations of the display items on or potentially on a visual window are made on a touch surface of a tactile interface device of the system. The tactile interface system of the subject invention has the capability to determine the location that the user is touching on the touch surface of the tactile interface device. With the tactile interface system of the subject invention, the selected display items on the visual window and for certain applications the selected display items that may potentially be on the visual window are mapped by software onto output tactile display items, which are virtual output regions on the touch surface of the tactile interface device of the system. As described below, if an output device other than a tactile display is being used, the output display items can take other forms, such as visible regions.

Figure 1:
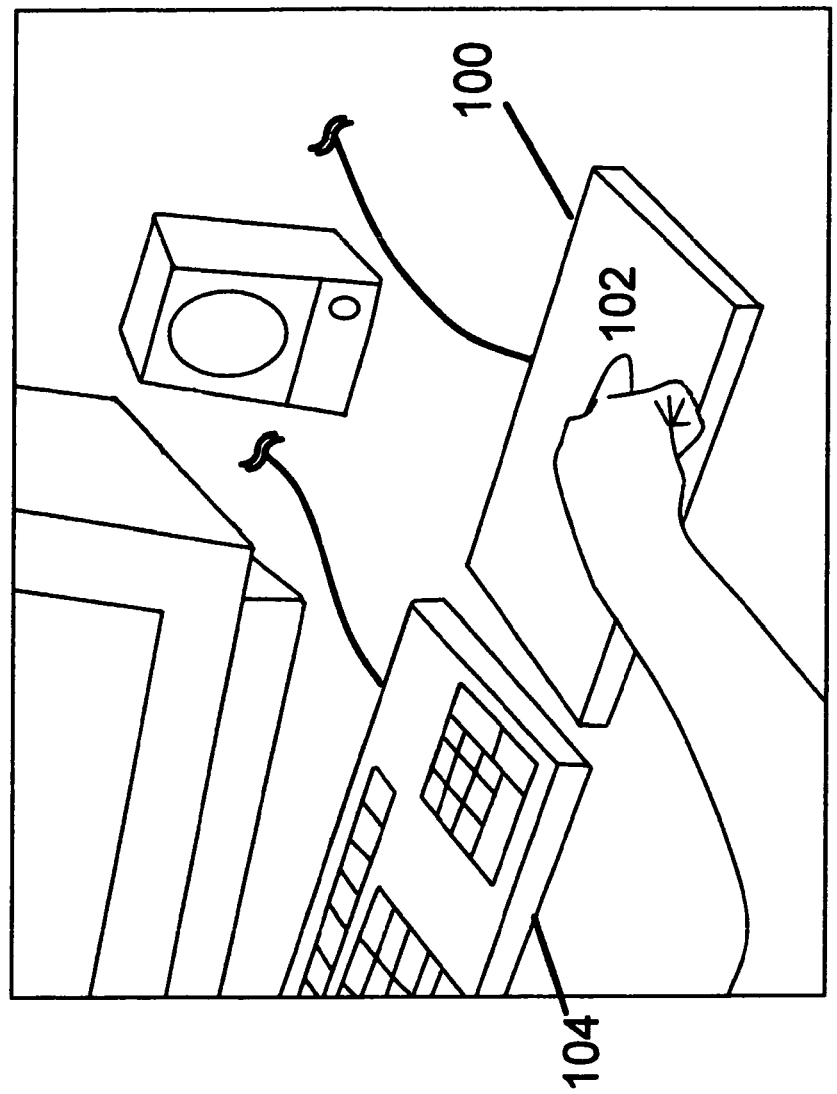
FIG. 1 is an illustration of a typical use of the subject invention as a tactile interface system.

FIG. 1 illustrates one embodiment of the tactile interface device 100 of tactile interface system of the subject invention. The tactile interface device 100 of FIG. 1 has a touch surface 102 similar in size to the surface of a typical mouse pad and is shown located next to a computer keyboard 104.

Figure 2:
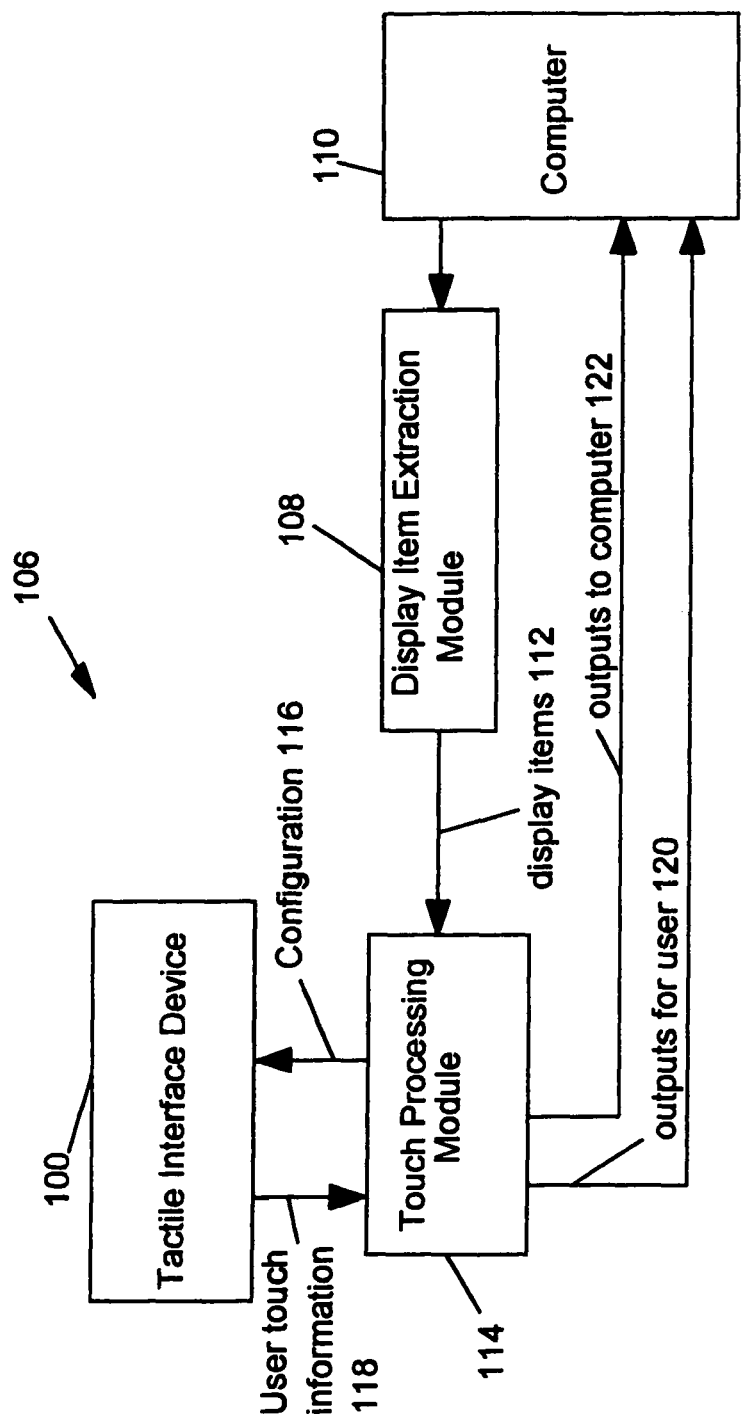
FIG. 2 is a block diagram of the tactile interface system of the subject invention.

FIG. 2 shows a block diagram of a preferred embodiment 106 of the tactile interface system of the subject invention. A display item extraction module 108 extracts information from a device for which a spatially-oriented display is useful, such as but not limited to a computer 110. The display item extraction module 108 outputs an extraction display item configuration formed of groups of display items 112, which represent relevant display items that are displayed visually on the display (e.g. monitor) of the computer 110. Optionally, the display item extraction module 108 can provide display items 112 corresponding to entities within the computer 110 that are not nor ail visually displayed on the display (e.g. monitor) of the computer 110, for example, values of variables within software. Thus, by presenting such display items, the present invention could be used to enhance the usage of computer 110 even if it does not otherwise have a graphically-oriented windows display. The display items are collectively referred to herein as display items 112. However, specific display items be referred to herein by the reference numeral 112 followed by a fouler case letter.

The display items 112 are sent from the display item extraction module 108 to a touch-processing module 114. The touch-processing module 114 takes the display items 112 sent from the display item extraction module 108 and defines a set of tactile output regions called a configuration 116, which is sent to the tactile interface device 100. The output regions in configuration 116 can correspond directly to display items 112, or can correspond to display item groups that have been combined to make the operation of the device easier for the user. The user can feel the configuration 118 by touching the touch surface 102 of the tactile interface device 100, e.g. with the index finger. As the user interacts with the touch surface 102 of the tactile interface device 100, user touch information 118, such as but not limited to the location on the touch surface 102 being touched by the user, is transmitted by the tactile interface device 100 to the touch processing module 114. As appropriate, the touch-processing module 114 generates outputs to the user 120 that are based on the user touch information 118 to augment the information provided to the user by the vibrations that are felt by the user from the touch surface 102. As described hereinafter in more detail under the subheading "Outputs for the User", these outputs for the user 120 may be transmitted to the computer 110 as commands to computer software running on the computer or may be transmitted directly back to the tactile interface device 100 to provide the user with additional information, such as but not limited to speech, tones, and/or visual indications, to augment the information provided to the user by the vibrations that are felt by the user from the touch surface 102. Additionally, the touch-processing module 114 generates outputs to the computer 122 that are based on the user touch information 118 and cause a windows application to activate appropriate display items. These outputs to the computer 122 are described hereinafter in greater detail under the subheading "Outputs to the Computer".

Tactile Interface Device

Figure 3:
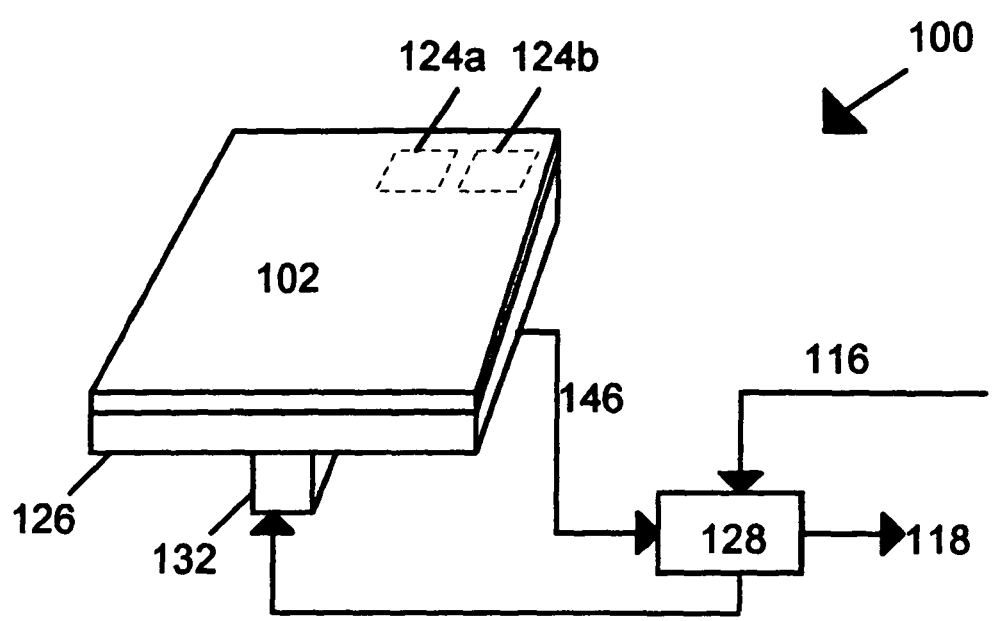
FIG. 3 shows a schematic view of a tactile interface device of the tactile interface system of the subject invention, which contains a touch surface that is felt by the user.

FIG. 3 illustrates a preferred embodiment of tactile interface device 100. The touch surface 102 of the tactile interface device 100 has a plurality of vibration areas or vibration regions that are output to the user (herein referred to as "output regions") that represent the display items of a window. The output regions are collectively referred to herein as output regions 124. However, specific output regions will be referred to by the reference numeral 124 followed by a lower case letter. The number of output regions on the touch surface 102 is determined, at least in part, by the size of the output regions required for a user to easily detect tactile information from the output region, by the size of the touch surface, the number display items that must be tactilely displayed at one time, the expected cognitive capabilities of the user, etc. Output region 124a and output region 124b are two of the plurality of output regions on the touch surface 102 of the tactile interface device 100. The output regions 124a and 124b will be used to exemplify the function of the output regions in describing the operation of the tactile interface device 100. Preferably, the touch surface 102 has a slightly rough texture, such that combining the real tactile edges of the texture with the vibration will maximize the realism of the haptic images of the various output regions.

The output regions 124a and 124b are not actually visible on touch surface 102, and there is not necessarily any fixed mechanical or electrical boundary corresponding to the output regions 124a and 124b on the touch surface 102. The touch surface 102 is connected to or part of a touch sensor 126, which determines the point or points (e.g., within output regions 124a and/or 124b) on the touch surface 102 that the user is touching. The touch sensor 126 communicates information on the vibrations regions, such as output regions 124a and 124b, being touched to a processor 128.

For example, the processor 128 receives, as a configuration from the touch-processing module 114, the identity and locations of the output regions 124a and 124b on the touch surface 102 that represent display items on a window. The processor 128 compares the location of a touch on the touch surface 102 to the location of the regions 124a and 124b on the touch surface 102, to find one or more that match. If the user is touching one of the defined output regions 124a or 124b, the processor 128 sends an activation command to a vibration device 132, which provides a vibration signal that can be felt by the user on the touch surface 102. In this way, the user senses the location of the output region, through touch only, when touching either of the output regions 124a or 124b. Preferably, the output regions 124a and 124b have different associated vibration characteristics. This allows multiple vibrating output regions to be located and explored by touch, while requiring as few as one vibration devise 132. Additionally, the processor 128 sends user touch information 118 through its output to the touch-processing module 114 to indicate what output region on the touch surface 102 is being touched.

A special situation arises when the user touches multiple points (output regions) on touch surface 102. If the user is touching multiple output regions representing multiple display items 112 with different fingers, for example output regions 124a and 124b, a different vibration cannot be produced by the vibration device 132, as it vibrates the entire touch surface. One solution to this situation is to provide an array of smaller, independently vibrating output regions of touch surface 102, with a separate vibration device for each output region. One optional embodiment of the invention, therefore, addresses this issue by producing a vibration only when all points of contact are on the same output region of the touch surface 102. Alternately, the vibration signal of the latest output region being touched can be continued until the user is no longer touching any point in that region. Alternately, a special vibration indicating an wow condition, or no vibration at all, can be produced when the user is touching multiple output regions. The preferred embodiment of the invention is for the system to compote the center of the set of points being touched by the user, and treat this as a single point, of touch on the display. This allows the user to locate and identify output regions with as many fingers as needed, which can be as close together as desired, Implementation of the Touch Sensor The touch sensor 126 can be implemented in a variety of ways. For example, the techniques used in existing touch screens or mouse tablets could be implemented as the touch surface, and are well known in the art. However, touch screens typically display a visual image as welt and may be difficult to use for imparting the vibrations needed for the haptic, tactile image for the user. Such devices can also be relatively expensive.

Figure 4:
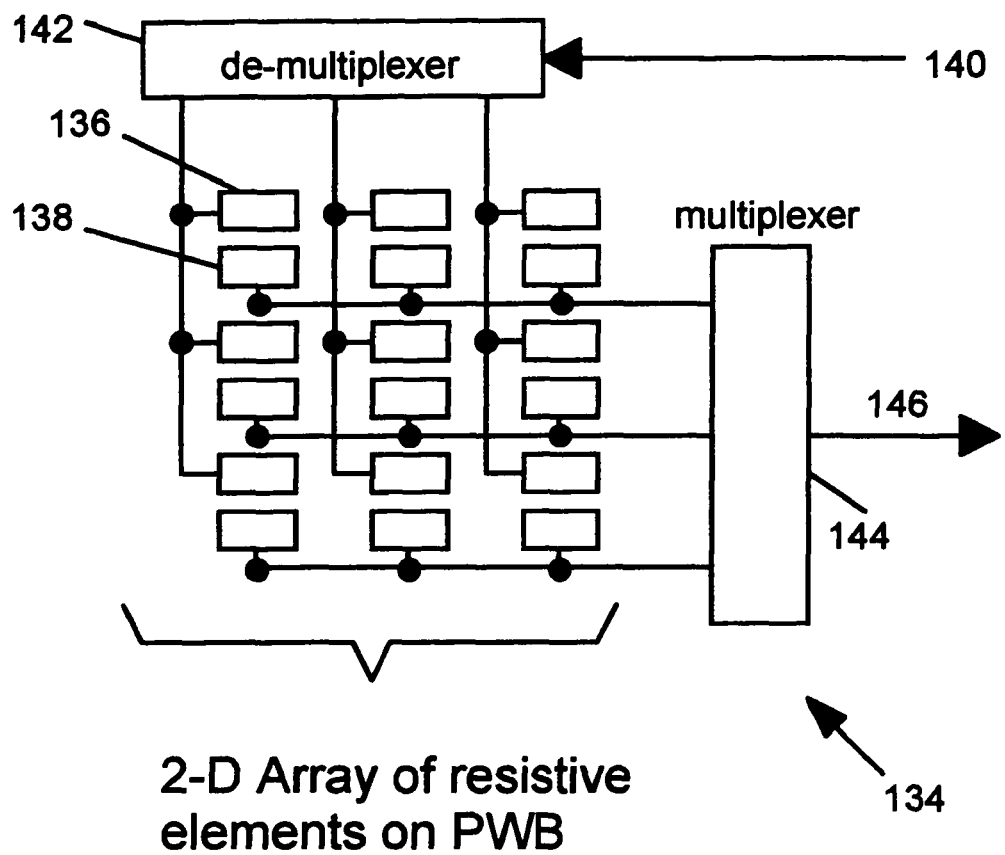
FIG. 4 shows a block diagram of a resistive sensor array that can serve as a touch sensor for the touch surface of the tactile interface device of the tactile interface system of the subject invention.

A preferred embodiment of touch sensor 126 is an array of resistive sensors on the touch surface, so that the location of touch on the touch surface 102 can be found by which resistive sensors in the array show a non-infinite resistance from the user's touch, FIG. 4 schematically depicts a preferred embodiment of a resistive sensor array 134, for a very small 3 by 3 array. In practice, an array with a much larger number of resistive sensors would generally be used. The resistive sensor array 134 is made from columns of column conductors, such as the column of column conductors 136, and from rows of row conductors, such as the row of row conductors 138. Upon receiving a column input signal, such as a voltage 140 from a control circuit, such as the processor 128, a de-multiplexer 142 sends a voltage to one column of column conductors, such as the column of column conductors 136. If the user is touching both a column conductor, such as a column conductor 138, and a row conductor, such as a row conductor 138, a corresponding voltage will be detectable on that row by multiplexer 144, and provided as an output on output 146 to the processor 128. Analog multiplexing and conversion under the control of the processor 128 of the received voltages from the two dimensional (2-D) touch surface array 134 is preferably used to locate a touch position of the user on the touch surface 102, as will be apparent to those of ordinary skill in, the art. In the preferred embodiment of resistive sensor array 134, the conductors, such as conductors 136 and 138 are created by conductive traces on one side of a printed wiring board (PWB). Any configuration of conductors that operates in a manner substantially similar to resistive sensor array 134 could be used as an embodiment of the invention.

Another embodiment of the touch sensor 126 is a similar arrangement of capacitive touch elements. Yet another embodiment is a set of force sensors, for example, one in each corner of the touch surface 102, such that the relative force on each sensor can be used to estimate the location on the touch surface being touched by the user. Many other techniques, such as optical or acoustic, could be used as embodiments of the present invention and will be apparent to those of ordinary skill in the art.

The circuitry for interpreting and/or measuring the sensing data in processor 128 from the touch sensor 126 can be implemented in a wide variety of ways as are known in the art. Preferably the approach for interpreting and/or measuring is digital. In a preferred embodiment, a microcontroller is used to perform the measuring and interpreting, as well as several other functions. This function is preferably included in processor 128. The micro controller optionally then formats the touch information for transmission as the user touch information 118 to the touch processing module 114, as described above. Optionally, the processor 128 may communicate wirelessly using, for example, radio frequency signals. The tactile interface device 100 could weigh just a few ounces, making it easy to use in the lap, held in one hand, or on a desktop orientation.

Implementation of the Vibration Device

The vibration device 132 can be implemented in a variety of ways. A preferred embodiment of vibration device 132 is a speaker voice coil, attached to the bottom of the touch sensor 126. Alternately, a small motor with an unbalanced load can be used as a vibration device, as is frequently done in cellular telephones and pagers. Alternately, a vibration device can be made from an electromagnet with a relatively large spring-loaded mass, as is done in virtual reality devices. Preferably, the vibration device 132 provides outputs in the range of 10 to 200 Hz. The construction of such vibration devices is well known in the art.

Several variations on tactile output, in addition to providing a fixed vibration amplitude and frequency for each output region, that may optionally be used with the present invention include:

1. Adding a strong impulse or step vibration at output region boundaries. The step function frequency content may provide a stronger illusion of the boundary of a output region representing a display item.

2. Using a decaying (e.g., ringing) tactile response after the user initially touches a output region, simulating the finger striking and causing the vibration, rather than a continuous vibration.

3. Providing different frequency responses corresponding to the size and shape of each output region.

4. Varying the frequency of vibration with the speed at which the user moves his or her finger over the touch surface 102, to provide an illusion of motion over texture.

5. Providing different vibration signals corresponding to different functions or states of the output regions.

6. Providing a pulsating vibration signal, and varying the pulse rate and/or pulse length to distinguish between the output regions.

Implementation of the Processor

The processor 128 is preferably a microcontroller. The microcontroller preferably contains a software program in memory that performs the data processing and communication functions described above, as well as, providing the vibration output waveform for the vibration device 132. Implementation of the hardware and software in the processor 128 according to this invention will be apparent to those of ordinary skill in the art.

Obtaining the Display Items from the Computer

As discussed above, the visually displayed graphical, text, and other items on the graphical user interface of a computer 110 or other electronic device with a visual display are referred to herein as display items 112. The display item extraction module 108 performs several steps to extract display items 112 from the computer 110, and will herein also be referred to as the extraction module. In the preferred embodiment, the extraction module 108 is software residing on computer 110 that is in communication with the windows application software, enabling the extraction module to passively extract information from the windows software. The windows application software does not necessarily need to have facilities for actively sending information to the extraction module 108. The extraction module 108 identifies the active window within the code or data of the windows software. The extraction module 108 also identifies display items by locating code or data in the windows software that is associated with display items 112 in an active window. Similarly, the extraction module 108 identifies text or labels associated with the display items. The extraction module 108 finds the coordinates of the edges of the windows and display items 112 on the screen.

There are at least three powerful software techniques known in the art to extract these data. One approach is to use "hooks", such as those supplied in the Microsoft® Windows® operating system. These hooks can be used to watch for window and display item creation events, and use the information from relevant display items, as they are created, to extract the needed data. Another approach is to use "cans" provided by the operating system to search through existing items after the application window is created. Another approach in the Microsoft® Windows® operating system is the "Active Accessibility Toolkit". This is a set of routines that developers can use to get the information about what windows and window display items 112 are on the interface. The Active Accessibility Toolkit can extract most of the information needed for the mapping from many popular windows software. Alternately, the application software may be configured to actively provide the data, for example, with computers or other devices that do not provide these calls or hooks. Alternately, a set of predefined "templates" of the available display items 112 for the various possible windows in each application can be used. In this case, the extraction module 108 looks up the display items 112 each time a new window is displayed, and outputs the looked-up display items. A template is preferably implemented as a file created especially for each windows application, which tells the extraction module 108 what display items 112 are on each window that may be displayed by the specific application. If the template files are available, the touch software would read a template file and associate any display items 112 referenced in the template file to the output regions specified in the template file.

In one example, data is extracted from Outlook Express®, a windows application. The following output from the extraction module analysis shows some of the important features on an Outlook Express® window.

3140 Outlook Express®
0 0 (−220, −184,588,398)'Outlook ExPress'
1 0 (4,556,804,576) 'http://www.microsoft.com/isap
2 0 (4,42,804,102)
3 0 (4,42,804,99)
4 0 (6,44,758,97) 'Compose' 'Message' " "
    'Send and' 'Receive' " "'Address' 'Book'
    " "
5 8192 (764,51,802,89)
6 0 (4,102,208,556)
7 129 (4,102,204,558) 'Outlook Express' 'Inbox'
    '(3)' 'Outbox' 'Sent Items' 'Deleted Items'
    'Drafts' '(1)'
8 0 (208,102,804,556)
9 0 (210,104,802,554)
10 129 (210,104,802,554)

In some simple cases, for example, when computer 110 is a simple handheld device or electronic game, or when, the application software running on computer 110 has a very simple user interface, extraction module 108 can be replaced with one or more simple, static set of display items 112, which would preferably also be statically converted into a corresponding set of configurations 116, and because they are static, touch processing module 114 would not need to perform any sophisticated processing to generate configurations 116 in this case.

The extraction module 108 thus extracts data from the windows application. The data includes at least the identity of each display item 112, and preferably includes the type of item, text label, and coordinates within the active window of each display item 112. The information about the display item 112, such as its type, label, etc., can be encoded as textual information for potential descriptive output to the user. Each time a new window is made active or the display items 112 change within the active window, the process is repeated, thus providing the touch processing module 114 with updated set of the current display items 112. The update is preferably substantially immediate, thereby reconfiguring the touch surfer 102 in real-time with changes in the display items 112.

Preferably, the extraction module 108 is implemented as software contained within computer 110 upon which the windows application is installed. In this manner, the tactile interface device 100 can be made quite simple and therefore inexpensively. However, if the host computer having the windows application is not capable of the processing required, as is likely the case with a simple game controller, the tactile interface device 100 could be made with a more powerful processor 128 and more (or all) of the functions of the extraction module 108 described herein could be implemented within the tactile interface device 100. Alternately, the extraction module 105 could be a standalone hardware device, such as a microcontroller. Alternately, the functions of the extraction module 108 could be distributed among more than one of the above alternate embodiments.

Defining the Configuration

The touch processing module 114 associates each relevant display item 112 with a output region 124, or set of output regions 124, as appropriate. The arrangement of a specific set of output regions 124 on the touch surface 102, the vibration properties associated with each region, and their correspondence to display items 112 is referred to herein as the configuration 116 of the touch surface 102.

The configuration 116 of the touch surface 102 preferably used to approximate the functions and spatial layout of the display items 112 in the active window. The configuration 116 of the touch surface 102 is preferably dynamically defined by software in the touch processing module 114 to correspond to the sizes and locations of display items 112 currently on the computer screen, or optionally the configuration 130 may be statically defined for the particular software application.

There are several inputs to the touch processing module 114. The display items 112 indicate the identity, location, and text contents being displayed on the computer screen of the computer 110 being used with the tactile interface system of the present invention. The touch processing module 114 defines output regions 124, based on display items 112 on the computer display, and provides the resulting output regions 124 and vibration properties of the output regions 124 as the configuration 116 to the tactile interface device 100. The output regions 124 are defined as areas on the touch surface 102, and the vibration properties of the output regions 124 indicate the amplitude, frequency, and associated timing information about the vibration for each region.

In the preferred embodiment, the display items 112 are simply mapped to the configuration 116 by a geometrical mapping of the window coordinates used in computer 110 to the touch surface 102 coordinates. Using techniques known in the art, each rectangle (or other shape) of each display item 112 is mapped to, its equivalent location on the touch surface 102, by transforming the coordinates of pixels on the computer screen to the coordinates of the touch surface 102.

There are several enhancements that are preferably made by the touch processing module 114 in defining the configuration 116 from the display items 112. For example, a minimum output region size is preferably enforced to prevent output regions 124 that are too small to, easily feel. Typically, the configuration 116 of the touch surface 102 is less complex than the corresponding visual representation on the computer screen. The simplification of the configuration 116 of the touch surface 102 is accomplished by the elimination of display items 112 that are not relevant to the unsighted user. Examples of such display items 112 include but are not limited to shading, many graphical images, windows within windows that are primarily for aesthetic purposes, etc. These types of display items 112 are useful for clarifying the visual display, but would be confusing for a touch-only interface. The techniques for making these adjustments and creating the configure ion 116 from the display items 112 will be apparent to those of ordinary skill in the art, using, for example, techniques similar to web page layout and web browser display software.

A non-exhaustive list of types of display items 112 and how they could be represented in the configuration is shown in Table 1:

TABLE 1

| Type of display item | How it could be represented on the touch surface |
| --- | --- |
| Text labels or editable text | Single output region corresponds to entire text item |
| Push button | Single output region |
| Menu item on menu bar | One of a row of output regions near top of touch surface |
| Drop-down menu item | One of vertical column of output regions, which could contain additional output region to right to expand item |
| Title bar | Single output region near top of touch surface |
| Outline item | One of vertical column of output regions. |
| Text in text window | Group of output regions to represent window. Row-like output regions to represent rows or paragraphs of text. |
| List item | One of vertical column of output regions |
| Radio button | Single output region, possibly round shape |
| Check box | Single small output region |
| Combo box | Single output region to represent selection. A vertical column of output regions for list items, as above, when the drop down list appears |
| Window pane | Large output region |
| Tab selections | Row of output regions at top of pane |

Displaying Hierarchical Information

Hierarchical information can be displayed with the tactile interface system of the subject invention. Hierarchical arrangements of output regions 124 are preferably represented by changes in frequency and/or amplitude of the vitiation as the user touches different levels in the hierarchy. This would allow output regions 124 within output regions to be represented in the tactile interface system of the subject invention.

One example of hierarchical information that could be displayed with the tactile interface system of the subject invention is text. FIG. 5 illustrates an example of hierarchical textual display items 112 on a computer display screen that could be displayed as a plurality of output regions 124 on the touch surface 102 of the tactile interface device 100. A text pane display item 112a on the computer display screen could be displace with the tactile interface system of the subject invention as a first output region of a set of output, regions 124. A paragraph display item 112b within the text pane display item 112a on the computer display screen could be displayed with the tactile interface system of the subject invention as a second output region of a set of output regions 124. A single line of text display item 112c on the computer display screen could be displayed with the tactile interface system of the subject invention as a third output region of a set of output regions 124. An individual word display item 112d within the single line of text display item 112c on the computer display screen could be displayed with the tactile interface system of the subject invention as a fourth output region of a set of output regions 124. Individual letter display items 112e and 112f of a word display item of the text display item 112c on the computer display screen could be displayed with the tactile interface system of the subject invention as a fifth and sixth output regions of a set of output regions 124. As described above, the entire hierarchical arrangement of output regions 124 could be implemented as regions of varying frequency or amplitude of vibration, but this many levels of varying vibration could be very difficult for the user to comprehend. Preferably, the user instead controls the level of output regions 124 being represented at a given time. For example, certain keys on the computer keyboard could be used to specify the presentation of paragraphs, lines, words, or letters. By indicating paragraphs, only those output regions 124 at the level of paragraphs would be felt. By indicating lines, only lines (preferably only within the last paragraph touched) would be felt, etc. This could significantly simplify the data available to the user. The control of the level could alternately be available from switches or regions on the tactile interface system of the subject invention, or other means.

A preferred embodiment of the present invention displays only one level of the hierarchy at a time. For example, in FIG. 5, initially only the large region 112b would be displayed. If the user accesses this region by touch, it can be expanded into the next lower level of the hierarchy by a "go down" or downward-motion command, for example, by multiple taps on the object, or by pressing a button, for example, on tactile device 100, or a key on the computer keyboard 104. At that point, only the display items corresponding to the level of the smaller region 112c would be displayed. Similarly, a "go up", or upward-motion command from the user would return the display to higher levels of the hierarchy for the user to explore a larger region of the display.

Preferably, hierarchical information an the computer display screen is organized by the touch processing module 114 so as to simplify the interface for the user, by restricting the display of output regions 124 on the touch surface 102 of the tactile interface device to only those output regions that correspond to display items that are within the higher-level display item 112 that corresponds to the output region most recently touched by the user. This would help to avoid the user straying off the current higher level output region that corresponds to a particular higher level display item onto an adjacent higher level region that corresponds to another higher level display item without noticing.

An Example Display and Corresponding Configuration

An example of the mapping of the display items 112 of a window to a configuration of output regions 124 is shown in FIG. 6. In FIG. 6, computer display window 112g is mapped to a output region 124g that includes the entire touch surface 102 of the tactile interface device 100. List item 112h is mapped to output region 124h. Text item 112j is mapped to output region 124j. Similarly text item 112k is mapped to output region 124k. Pane 112m is mapped to output region 124m, pane 112n is mapped to output region 124n, and pane 112p is mapped to output region 124p, Ioon 112r is mapped to output region 124r. Likewise, all other user interface display items 112 determined by the software to be relevant will be mapped to output regions 124 on touch surface 102 of the tactile interface device 100. Dynamic items on the window, such as a drop down menu, will likewise be mapped to dynamic output regions 124, which are defined on the touch surface 102 of the tactile interface device 100, Consolidation of Objects into Display Item Groups With many computer windows, such as complex web pages, there are too many display items for a user to easily find and distinguish from each other using touch, if all were to be displayed as individual output regions. Therefore, it is preferable to limit the number of items simultaneously being displayed. Several solutions to this problem are possible, including:

Zooming the tactile display to represent only a small portion of the computer screen having an appropriate number of display items Consolidating the display items into a manageable number of display item groups, applying a useful label to each group, and allowing the user to expand a single group of interest at a time.

Warping the coordinates of the screen so that a portion, of the screen is presented in a zoomed fashion, whereas the rest of the screen has very small items that cannot directly be felt effectively.

Preferably, the consolidation option is used. The word 'consolidation' will be used herein to describe the process of grouping items into display item groups, or to describe a set of groupings.

Consolidation preferably consists of creating a single level of grouping in other words, each group contains a set of items from the screen, and a group does not itself contain sub-groups. However, for particularly complex displays, it may be good to haw display item groups within display item groups. The techniques described below can be considered to apply to either case.

A preferred technique for consolidating the items on the display into a manageable set of groups is by starting with all nodes in one large group, then splitting the large group into smaller groups until a suitable set of groups is created. It is important that the splitting be done in a way that keeps related items together. The device would be difficult to use if the groups contained display items that did not logically belong in a group.

Splitting of a group can be done along a line of gaps between the items in a group. The gaps in a group of display items can be found by iterating through the items, starting with an interval representing the entire x or y edge of the group, then removing parts of the interval corresponding to the extent of each item, as defined by its location. After iterating through all the items in the group, any remaining intervals that have not been removed are the gaps that can be used for splitting.

FIG. 7a and FIG. 7b demonstrate a process of finding gaps between a set of display items on a displayed window. FIG. 7a depicts a displayed window 150 containing a set of display items 112s, 112t, 112u, 112v, and 112w. Using this technique, gaps 151a and 151b are found. The disadvantage of finding gaps with this technique is that the only gaps found are those that extend across the entire extent of the area being consolidated. FIG. 7b depicts a more complex gap-finding technique. In the case of displayed window 162, display item 112x is present instead of display item 112t of window 150, so gap 151a no longer exists. This technique considers the coordinates of the corners of each display item, for example, display item 112s. Potential gaps between the corner of the display item 112s and the edge of the extent of the area, in this case the window, being consolidated are hypothesized, and a line segment corresponding to the hypothesized gap is intersected with the outline of the other items 112t through 112x in the area being consolidated. If intersecting line segments, for example, line segments 151c and 151d are found, these can be used as the gaps for splitting into smaller groups.

Another alternate embodiment of the invention is possible for cases where there are no reasonable gaps with which to split the display items. For example, if the display items are irregularly arranged, no suitable gaps may exist. In this case, splitting can occur where the splits intersect some of the display items. For example, an algorithm similar to the gap-finding technique shown in FIG. 7b can be implemented, but instead of requiring no intersections with display items to be found, a split line is considered possible when the line representing the split meets certain criteria as compared to other split lines, such as:

The split line intersects fewer display items,

The length of the split line in which it intersects display items is less,

The split line intersects display items in a way that most of the split display items are on one side of the split line, for example, if only a thin slice from the edge of a display item is intersected, this may be considered superior to splitting a display item through its middle.

The split line intersects types of display items that are more acceptable for being intersected, for example, it may be more acceptable to split through graphical images than through text display items.

When split in this way, preferably the display items that are intersected by the split line are considered to be part of only one of the groups into which they fall. Preferably, such display items are considered to be part of the group into which the greatest proportion of their area fall.

Once a set of display items has been split into smaller groups, the splitting process continues, that is, the smaller groups are in turn split into still smaller groups, until there are not too many display items in any group and there are not too many groups to be displayed. A preferred embodiment is to perform the consolidation until there are fewer than, for example, 20 groups and each group has fewer than, for example, 20 display items. Other similar techniques for finding the gaps that involve creating groups where the group boundaries involve gaps between adjacent display items will be apparent to those of ordinary skill in the art.

Search Technique to Find a Good Grouping

There may be many different ways in which a set of display items can be divided, for example, in a large web page there may be dozes of gaps in the horizontal and vertical direction. Therefore, it is important to be able to consider and choose between alternate possible splitting operations so as to create a usable set of groups. Randomly selecting gaps and groups does not yield usable results, because items that logically belong together may end up in separate groups if there happens to be a gap between them. A preferred embodiment to systematically examine alternatives is to use search techniques developed in Artificial Intelligence. Search software systematically generates candidate display item groups, or intermediate partial groupings of items, then evaluates how good each candidate is. A preferred technique for doing this is to use search space nodes, where each node represents a set of splits of the display items into two or mate sections. Using Artificial Intelligence terminology, operators are applied to the search space nodes to create new candidate, or potential, consolidations, and evaluation functions are used to score how promising each candidate consolidation is. A preferred embodiment is that each node represents as a set of rectangles, each rectangle containing a set of the display items on the display, and the boundary of the rectangle signifying the extent of a corresponding display item group. Preferably, each item on the screen is wholly contained within one rectangle, that is, within one group.

A node in this search space represents a potential solution to the consolidation of items—it can be a consolidation of the entire display, window, or a consolidation of a portion of the display or window. There are several operators that can be used to expand a node during search. Some of these include:

splitting a group in the search space into two horizontally
splitting a group in the search space into two vertically
splitting a group into more than two horizontally or vertically
splitting a group into two or more groups by splitting along gaps from a display item corner, as shown in FIG. 7b
Removing a data structure that organizes data on the computer, such as a table, so that gaps between its members can be exposed for future operators.
In addition to splitting, an alternative is to also include merging two or more adjacent groups into a larger group
In addition to splitting and merging, splitting and merging can be utilized in combination with each other An evaluation function preferably is used to score the goodness of each node in the search space. The evaluation function is used to chime which candidate groupings are the best consolidations. Some preferred evaluation functions are:

The amount of empty space not occupied by any rectangles. More empty space not within a group indicates a higher score.
The number of display items within each group. A better score is given to solutions that have an optimal number of items, for example, between five and 20.
The regularity of items within each group. For example, if items form a single line of items, or if they are neatly organized into a rectangular grid of rows and/or columns of display items, this indicates the items may belong together. A better score is given to a regular arrangement of items.
Whether the tap of groups appear to be titles. This can be obtained by sawing whether the top of a group is a single text or a link, possibly also containing some control buttons, whether it has a larger font size than surrounding text, etc.
Whether groups consist of display items that are already represented as groups on the computer. For example, web pages often contain display items called tables.
The table contains information that is already divided into folks and columns. The evaluation function can provide a favorable score to a group that contains an entire table or section of the table, and lower scores, for example, if a group contains parts of a table mixed with non-tabular information.
If the display items are numbered whether the groups contain contiguously-numbered items. For example, Microsoft Active Accessibility, one software tool used to extract display items, numbers the display items. A better score can be given when the numbers tend to not overlap between groups.

The overall score for a node in the search space is a combination of the scores of the one or more of the evaluation factors, such as a weighted sum.

Reduction of the Search Space

In a complex computer display window, for example, a news web page, the search space may be very large. For example, if there are 15 different ways to split the set of groups into smaller groups, there could be approximately 15×15×15 new nodes in the search after three expansions of nodes by the splitting operators. This could quickly become impractical. To reduce the search space, some alternatives can be applied, such as:

Keeping only those nodes with the highest overall scores, for example, within a percentage of the best scone, or keeping a certain number of best nodes
Keeping a number of nodes with the highest ranking for each of the evaluation function factors.
Discontinuing expansion of nodes that have more than a threshold number of groups In summary, for example, the consolidation process can prod as follows: At the beginning, there is a single group that contains the entire set of elements to be organized. Gaps in the x and y directions are located. For each operator, for example, possible way of splitting the group into smaller groups, a new node in the search space is created. The evaluation functions are applied to each new node to determine which are the best. The search-space reduction methods above are used to keep only the most promising nodes. In turn, the above process is applied to each of the new groups in each of the new nodes. Finally, the final solution is found when the best node has a good enough evaluation-function score.

The display of the groups and items within groups can be accomplished using any of the methods for displaying hierarchical information that are described above.

Consolidation by Merging, Rather than Splitting

An alternate embodiment of consolidation in the present invention is to create groups by merging display items into groups, instead of, or in addition to, splitting larger groups into smaller groups. Preferably, the starting point for a merging consolidation technique would be a configuration containing all the individual display items. Each display item can conveniently be thought of as a group containing one element; however, it is not necessary to represent individual display items in this way. Consolidation thus consists of joining two or more groups into a single new group.

Similar to the consolidation process described above, a search process can be defined, but where the operators are merge operators, rather than split operators. Some merging operators include:

merging a group with one or more groups that are adjacent to it horizontally
merging a group with one or more groups that are adjacent to it vertically.

merging a group with one or more groups that are adjacent to it horizontally and vertically.

merging a group with one or more groups that are closest to its boundaries.

merging a group with one or more groups that are adjacent, according to the ordering of display items provided by the data extraction module. For example, the ordering of display items within an HTML document or the ordering of elements provided by Microsoft Active Accessibility.

merging a group with one or more groups that are contained within the same data structure that organizes data on the computer, such as a table, so that the grouping of the data structure is reflected in the grouping of the new group.

In addition to splitting, an alternative is to also include merging two or more adjacent groups into a larger group Consolidation using these operators can proceed in a one-pass manner, in which logic is applied to merge the groups according to their type and location. Preferable, a search technique similar to the search technique described above can be used with the merge operators. As the groups are merged in various possible ways, an evaluation function can decide which groups are the best. In addition to the above evaluation functions, additional useful evaluation functions include:

The extent to which the groups take on a rectangular form. Rectangularly-shaped groups would generally be preferred.

The amount of empty space within a group. Groups containing less empty space would be preferred, The degree to which data structures within the original window representation, such as tables, is wholly contained within the grow).

Similarly, search space reduction techniques can be used to reduce the inherent, combinatorial explosion, for example, by retaining only the best groups at each step in the search, and other techniques analogous to those described above.

Generating Labels for the Groups in a Display

Descriptive labels are preferably generated so that the user can understand what is in a group, to know whether the group likely contains contents of interest to the user. Some labeling strategies include:

Describing the type of items in the group: for example, "horizontal row of links", "14 paragraphs" "text entry with pushbuttons"

Giving some examples of the items in the group: for example, "horizontal row of links including news, downloads, about us,"

Looking for possible titles within the group: for example, if a text item X is found at the top of a group and it has a larger font than the text below it, add "entitled X" to the label.

Looking for keywords, for example on web pages, for the words "News", "Weather", "Sports", "ad", etc, and include these keywords in the description, if found.

Multiple Windows on the Display

One of the common features of windows software is that multiple windows are often concurrently present on the computer display screen, but only one window is currently selected. For simplicity of the interface, the touch surface 102 of the tactile interface device 100 may preferably be configured to represent only the currently-selected window, rather than the entire display on the computer display screen. To activate another window, a "next window" output region 124, or a special pushbutton or switch adjacent to the touch surface 102 of the tactile interface device 100, may be used by the user to switch to the new window and continue operation of the device (similar to the Alt-Tab key sequence in Windows®). The user may navigate through all the windows on the screen by use of this feature, to get to the desktop, other applications, etc. Alternatively, one or more output regions 124 may serve the function of selecting from among available windows, analogous to the way several windows are presented in the task bar of a Windows® application. Alternately, the task bar may be represented along the bottom or side of the touch surface 102 of the tactile interface device 100, even if only one window is displayed in the main section of the touch surface 102. Alternately, the system can rely on keyboard commands to move between windows, such as the Alt-Tab key sequence used in Microsoft® Windows®.

One possible type of user input is mouse clicks. Mouse click actions can be generated in several ways. Preferably, the user produces mouse clicks by tapping on a output region 124 two or more times. By measuring the time and location of the taps, the software of the touch-processing module 114 can detect such mouse click actions. Thus, the user can click on the actual output regions 124 anywhere on the touch surface 102, analogous to the way a mouse is clicked on a display item 112 that is pointed to on a standard computer display screen. For example, the user could produce a mouse click on the output region 124a of FIG. 3 by tapping twice on that output region. For the case in which the system cart measure relative force associated with the user's touch, a mouse click can be simulated by interpreting click gestures on the output regions 124, e.g., pressing harder or briefly lifting, then tapping the touch output region again. Yet another optional mouse click method is a "dwell" feature, in which the user implements a mouse click by touching the same point on the touch surface 102 for more than a predefined length of time. Alternately, special mouse buttons could be installed adjacent to the touch surface 102 of the tactile interface device 100. Alternatively, a user can approximate mouse clicks by using existing external pointing and clicking devices for the disabled. In the preferred embodiment of the subject invention, mouse clicks and other touches of the user are encoded by the processor 128 and transmitted to the touch processing module 114 as user touch information 118.

Changing the Realm Sizes of Objects

In some circumstances, the relative slims and, shapes of display items on the computer display may not be appropriate for use on a tactile display, or on other types of alternate displays on which the display items are to be presented to a user. For example, the long, thin menu bar on the top of a window is appropriate visually, but might be difficult to find on a tactile display. Therefore, it is desirable to be able to change the relative sizes of objects on the display.

A preferred embodiment for changing the relative sizes of the displayed objects while maintaining their spatial relationships (above, below, to the right of, to the left of, etc.) is to warp the coordinates. Ideally, the warping is done so that the axes are expanded or contracted in scale at different points along the axis, so when plotted, the rectangles of the objects will be more nearly of the same size. This embodiment of can be adjusted to either make as nearly equal as possible, or preferably, to attempt to bring the size of all objects above a minimum threshold.

An example implementation of this process is described by the following steps. The process can be done independently in the x (horizontal) and y (vertical) axes of the display:
1. Create a list of display items that are smaller than desired along the axis
2. Make note of each point on the axis that corresponds to the beginning (e.g., left or top) of a display item or the end (e.g., right or bottom) of a display item on the axis. This divides the axis into intervals between those points,
3. in each interval between the points identified in step 2, identify which display items from step 1 include that interval.
4. Count how many intervals contain items that are too smelt
5. Add a small amount of length to sisal interval that contains items that are too small, and subtract a small amount from each interval that contains no such items, so that the total length remains the same.
6. Return to step 1.

FIG. 8a and FIG. 8b depict a display that undergoes a press of resizing of the displayed items. FIG. 8a depicts the original display 161. Output regions 163a and 163c are too small for a user to easily sense, whereas output regions 163b and 163d are sufficiently large. Coordinate axis 166 depicts a the points where a output region begins or end. After applying the above algorithm, the points on coordinate axis 165 are moved relative to each other so that intervals overlapping items 163a and 163c are expanded, and an equal amount of space is removed from other intervals that do not overlap them. The results of the process are depicted in FIG. 8b. In this figure, output regions 164a through 164d are equivalent to output regions 163a through 163d, except for their location coordinates. Adjusting the coordinate axis results in the new coordinate axis 166, and the output regions 164a and 164c are now sufficiently large that they can be used. Of course, this type of transformation, as well as the consolidation procedures described elsewhere herein, can be applied to modify the coordinates of display items, or later in the process, to modify the coordinates of output regions that correspond to the display items, as is shown here.

Some adjustments to this process may need to be made, for example, if all intervals contain at least one object that is too small, only those intervals that contain the most such objects can be expanded. Other such variations on the process will be apparent to those of skill in the art, and other techniques that change the relative size of objects to make them easier for the user to sense will be apparent to those of skill in the art.

To maximize the size of the displayed items, a further step can be done to eliminate gaps between objects. An interval can be considered redundant if is not the case that an item begins at one end of it, and an item ends at the other end of it. Redundant intervals can be eliminated in such cases. This W tend to line up the edges of the display items. Optionally, a further step can be invoked in which the gaps are removed as above, then a gap of controlled dimension, for example, a fixed gap, can be inserted between all intervals, for the purpose of having controllable gap sizes, rather than the arbitrary gap sizes the display may have originally contained.

Equalizing Widths, Heights, or Sizes of Objects that Belong Together

A useful adjustment of object sizes is to make objects that belong to the same row or column of objects to be the same height or width. A preferred, embodiment for doing this is to go thru the objects in a group; if they are found to be the only object in the horizontal or vertical direction within the rectangle of the group, they are expanded in the respective direction to extend to the edges of that group.

Scrolling

Scrolling is needed whenever there is not enough space on the touch surface 102 of the tactile interface device 100 to represent all of the contents of a windows display using adequately-sized output regions 124, or when a display item 112 on a windows display includes a scroll bar and an alternative to representing the scroll bar itself on the window is desired. Implementing the scroll function by using the output regions 124 darling the =cites display item 112, itself, rather than using a separate scroll bar, has advantages in simplicity of the haptic display. For example, there may be twenty menu items in a menu display item 112, but sufficient space in the corresponding output region 124 for only ten smaller, contained output regions for displaying the individual menu items. FIG. 9 illustrates scrolling output regions 124c and 124e placed, near the ends of the group of output regions 124d. The scrolling output regions 124c and 124e are preferably differentiated from the other menu item output regions by a distinct tactile vibration feel, or alternately by a special sat % sound or voice prompt when touching them. Scrolling occurs when the user touches the scroll output regions 124c or 124e appropriately (preferably by, a click), causing the mapping of the group of output regions 124d to represent different menu items accordingly. For example, clicking the "up" scroll output region 124c causes the output regions 124d to indicate menu items that are above those currently displayed. Conversely, pressing "down" scroll output region 124e causes the output regions 124d to indicate menu items that are below those currently displayed.

Another embodiment of a scroll function using, the same output regions as the display items is by repeated touches of the first or last display item in the set of output regions representing the scrollable set of display items. For example, in FIG. 9, output regions 124c and 124e would represent menu items, as well as being used for scrolling. In this embodiment, repetitive touching of the first output region 124c would cause scrolling upward, and repetitive touching of the last output region 124e would cause scrolling downward.

Multiple Tactile Display Sections

It is desirable, in order to reduce the tactile clutter, to display some commonly-occurring display items of windows in a special part of the tactile display separated by fixed tactile boundaries, for example, a separate area located along the top edge, or in a separate, statically separate part of the display or within a raised or lowered rectangle separate from the "main" tactile display area where most display items are displayed. A preferred embodiment of the separate display sections is to provide one large area in which the main section and other sections are separated by strips of molded plastic or other material. Examples of display items that amid be displayed in separate sections on the tactile display include menu bars, tool bars, buttons for expending, closing, maximizing, or minimizing window and status bars. Preferably, the vibration mechanism can be shared between the main display section and the other display sections, alternately, separate vibration actuators can be attached to each section.

FIG. 10 depicts a display surface 171, in which there is a main tactile section 172, along with a special menu bar tactile section 173 and a tool bar tactile section 174. When the user touches the main tactile section 172, all display items except those assigned to the other tactile sections 173 and 174 will be accessible. Similarly, only the menu bar items will be accessible when the user touches tactile section 173 and only the tool bar items will be accessible when the user touches tactile section 174.

Other uses of multiple tactile sections are also possible in alternate embodiments of the present invention. For example, a small side display may be included to show what is on the main screen. If the contents of a group are zoomed or moved in any way when the group is expanded into its constituent objects, users may become confused about how what they are touching within a group corresponds to the overall contents of the screen.

FIG. 11*a* and FIG. 11*b* depict a tactile display with a main display section and a smaller display section showing the extent of a group of display items. In FIG. 11*a*, the original layout of a window 181 is shown. It includes a variety of display items. FIG. 11*b* depicts a tactile display 182, containing a small display section 183. When the user touches the small display section 183, it displays a single object 184 showing the extent of the display item group that is displayed on the main tactile display section 185. As can be seen from the figures, the output regions on the main display 185 represent the detailed display items from one of the areas in window 181, and the single object 184 shows where in window 181 the detailed display items are.

Another approach to maintaining it about where the user is exploring is to have multiple screens for the various levels being presented. FIG. 12 depicts a tactile surface 191 with multiple display sections to display both display items and display item groups. The original layout of window 181 is again being represented here. Section 192 displays the output regions corresponding to display item groups, and section 193 displays the contents of the active group 194 from section 192.

When multiple tactile display sections are provided, they can each vibrate independently, using the techniques and methods described above, or they can all be placed on the same vibration surface, using an algorithm to decide which section should be used for the representation. For example, the algorithm could decide to represent information as:

the section being touched that represents the highest level of detail the section being touched that represents the lowest level of detail the section most recently touched the section that most recently has had the user move to a new object or position Alternatively, an error sound or vibration could be created to enforce that the user may not touch more than one section at a time. Alternately, no vibration could be given while an invalid touch is being made on more than one section.

Outputs for the User

The Touch Processing Module 114 preferably also provides outputs to the user to augment the vibrations that are felt from touch surface 102 of the tactile interface device 100. For example, the vibration may indicate the presence and type of a display item 112, but also augmented with much more information, such as the text associated with the display item, its state on the display, etc. is needed for the user to fully comprehend what the display item is. In determining which display item 112 is being touched, the touch processing module 114 extracts the text from the corresponding data in the display items 112 and preferably directs the label text to a text-to-speech routine, as pad of outputs for the user 120. Other types of data in outputs for the user 120 may include indications of new windows being displayed, popup menus or lists, and notification that new items have appeared on the display, preferably encoded as text to be read by a text-to-speech function on computer 110.

Alternately, such text information can be sent to a large text display on the computer display screen, for users with partial sight, or a refreshable Braille device. Similarly, mouse click and window changing actions may be conveyed to the user by a sound or other non-visual method from the computer.

Alternately, for example when the delay must be minimized or computer 110 is a device without advanced user output capabilities; some types of outputs to the user may be produced by hardware not enclosed in computer 110. For example, beeps could be provided when touching scrollable display items, when moving to a new output section, etc. In this case, the hardware to perform these functions is preferably packaged within the tactile interface device 100, for example, as a small speaker driven from an output of processor 128. In this embodiment, this type of outputs for user 120 would be output to tactile interface device 100, rather than to computer 110. The implementation of these functions will be apparent to those of ordinary skill in the art Outputs to the Computer When an output region or set of output regions 124 is touched, the touch software of the torch processing module 114 preferably causes the windows application to activate the appropriate display items 112, such as to place the mouse at the location specified by the user data, effecting a mouse click as previously described, placing the cursor in the corresponding text field for entering text, etc. These actions or commands to the computer 110 are invoked through the outputs to the computer 122 that are sent to the computer 110 from the touch-processing module 114. The appropriate output to the computer 122 depends on the type of display item being clicked, the context of the clicks, etc. The relevant type of action is determined by touch processing module 114, for example, by a lookup table containing display item types, user touch types, and the appropriate computer output. Techniques for generating outputs or commands to the computer 122 are well known in the art. For example, calls provided by the windows operating system can be used to emulate mouse moves, mouse clicks, keyboard keystrokes, etc. Software such as the Active Accessibility Toolkit also provides computer command capabilities as part of the data extraction functionality. Alternately, hardware inputs, such as the generation of mouse control signals into the mouse pod of computer 110 could be used.

Preferably, the touch-processing module 114 is implemented as software contained within computer 110 upon which the windows application is installed. In this manner, the tactile interface device 100 can be made quite simple and therefore inexpensively. However, if the host computer having the windows application is not capable of the processing required, as is lately the case with a simple game controller, the tactile interface device 100 could be made with a more powerful processor 128 and more (or all) of the functions of the touch processing module 114 described herein could be implemented within the tactile interface device 100. Alternately, the touch-processing module 114 could be a standalone hardware device, such as a microcontroller. Alternately, the functions of the touch-processing module 114 could b distributed among more than one of the above alternate embodiments.

Displaying Images

One type of display item 112 that often appears in a graphically-oriented environment is an image. With the tactile interface device 100 of the subject invention, an image can also be represented as a output region 124 within which the vibration properties vary with the properties of the image. For example, the frequency of vibration could preferably correspond to the brightness of the touched point in the image. Alternately, the amplitude of the vibration could correspond to the brightness. Varying audible outputs, for example, tones could also be produced to accentuate the properties of the image. Optionally, the frequency and/or amplitude of the vibration, or corresponding tonal outputs could vary with color in the image, Alternates to Display on a Tactile Surface Although the tactile surface described above, for example, in FIG. 1, FIG. 2, and FIG. 3 is very useful for someone who is completely blind, there are cases where a person with low vision could use other ways of interacting with the set of display objects. For example, a person with low vision might not be able to cleanly see a standard computer screen, but could see a display of several large, colored rectangles shown in high contrast. Similar problems would be encountered by the user of a small cell phone, watch, or other portable electronic device. Although such devices are available with relatively large screens that can be used to show web pages and other similar content, the very small displays on miniature cell phones are not useful for this, but could be used to display a smell set of rectangles.

An alternative embodiment of the present invention therefore is its use as an accessible visual display that can be used on any graphical output device, such as computer screens, personal electronic device screens, plotters, etc. Instead of displaying the simplified content described above in a tactile manner, the invention can instead be used to display the simplified content visually. For example, instead of displaying the display items 112*b* through 112*f* in FIG. 5 as corresponding output regions on a tactile surface, visual output images corresponding to the display items would be shown on the graphical output device. The output images could be simple rectangles of a constant color, images that approximate the visual content of the corresponding display item, or other shapes or patterns encoding the location and role of the associated display item. (The term "image" is used here to clarify that the output region is shown as a visible entity. However, it is not necessarily a bitmap image or a picture, and can be other types of visible entities such as a simple colored rectangle or other visible objects that can be sensed as an item on the display.) A preferred embodiment is to display the output regions as high-contrast rectangles on a visual display. Likewise, the output regions 1120 through 124*n* in FIG. 6 could be displayed as high-contrast rectangles on a visual display. The same techniques for obtaining the configuration of display items, and for consolidation and resizing operations described above would apply equally well to the alternate visual display. The output images could be displayed in any manner that makes them easy to see, for example, as bright rectangles on a dark background, or in color as multiple contrasting colors, where there is maximal color difference between adjacent items on the display, FIG. 13 depicts an example visual display 200, on which display objects 201, 202, 203, and 204, corresponding to the groups making up a web page, are displayed. User input in response to visual display 200 could either be through any input to the associated electronic device, such as a touch screen input, a stylus input, keyboard keys corresponding to the display objects 201 through 204, or through the use of buttons on the electronic device, for example, a previous, next, up, and down keys that move between items on the display, and move up and down in the hierarchy of display levels, for example, between groups on the display and the display items within each group. Other custom-made inputs to the electronic device, such as external switches or peripherals, could also serve this function. For any of these input modes, interface software corresponding to the touch software described above would be used to associate the user inputs with the output regions, the associated display items, and full use of the system would proceed as described above.

Preferably, in addition to being a plain visual rectangle, each rectangle is labeled with a very brief description of the display item. Preferably, there is also an indication of the type of contents, e.g., text paragraphs, text entry, graphics, buttons, links, etc. Alternately, a special portion of the visual display, for example, a strip 205 along the bottom of visual display 200, can be used to display the description for the latest item that has been accessed. Alternately, computer voice output could be used to provide the textual information to the user, for example, if the users eyesight is sufficient to see large, high-contrast shapes on the screen, but not sufficient to read text.

Preferably, special indications are provided so that it is easy to see what object the user has accessed with touch, stylus, mouse, or buttons. For example, especially if there is no mouse, the rectangles could be labeled with a number to indicate which button to push to get text about the group or to click on it to expand it. Preferably, a larger than usual mouse pointer can be shown, for example, a very large arrow. Alternately, the accessed item can be indicated by blinking or highlighting, for example, by creating a special border 206 around display item 204, or by changing the color of the object, or by blinking it on and off.

Alternately, combinations of visual and tactile display modalities may be implemented as embodiments of the present invention. For example, a touch surface could be used for user input, and a visual display used for output, with or without a corresponding vibration output. Alternately, a tone output could be used instead of a vibration output Use with or without a Monitor The subject invention can provide an interface to a graphical user interface regardless of whether a computer monitor is used. Because the touch software extracts the necessary information from the graphical user interface code that creates the display, as opposed to extracting from the display itself, the invention can function independent of a monitor. As a result, the touch software analysis may occur not only upon information visually displayed to a user, but to information potentially visible to a user within a window.

While there has been illustrated and described what is at present considered to be the preferred embodiment of the subject invention, it will be understood by those skilled in the art that various changes and modifications may be made and equivalents may be substituted for elements thereof without departing from the true scope of the invention.

What is claimed is:

1. An interface system for enabling a user to interface with an electronic device, comprising:
   an extractor configured to extract, from an operating system of the electronic device, a plurality of display items on a display of the electronic device and to discover the coordinates of each of the display items within a coordinate system of the display of the electronic device;
   a consolidator configured to create groups of display items by defining different regions within the coordinate system of the display of the electronic device, wherein each group of display items is a subset of the plurality of display items, wherein each of the plurality of display items is identified as being part of the group of display items if one or more of its coordinates fall within a particular region; and a tactile device configured to output the group of display items created by the consolidator to the tactile device to provide non-visual information to the user about the group of display items, wherein the tactile device is further configured to output:

a first tactile output having strong impulse or step variation tactile response at a boundary between two regions, a second tactile output having a decaying tactile response after the user initially touches one of the regions, a third tactile output having a tactile response that varies in frequency depending upon a size and a shape of the regions, a fourth tactile output having a tactile response that varies in frequency depending upon a speed at which the user moves its finger over the tactile device, a fifth tactile output having different vibration signals corresponding to different functions or states of the regions, and a sixth tactile output having a pulsating vibration signal with varying pulse rate or pulse length to distinguish between the regions.

* * * * *